Oct. 17, 1961    M. SHANE    3,004,636
CEILING SUPPORT MEMBER WITH ADJUSTABLE HANGER BOLTS
Filed March 18, 1959    2 Sheets-Sheet 1
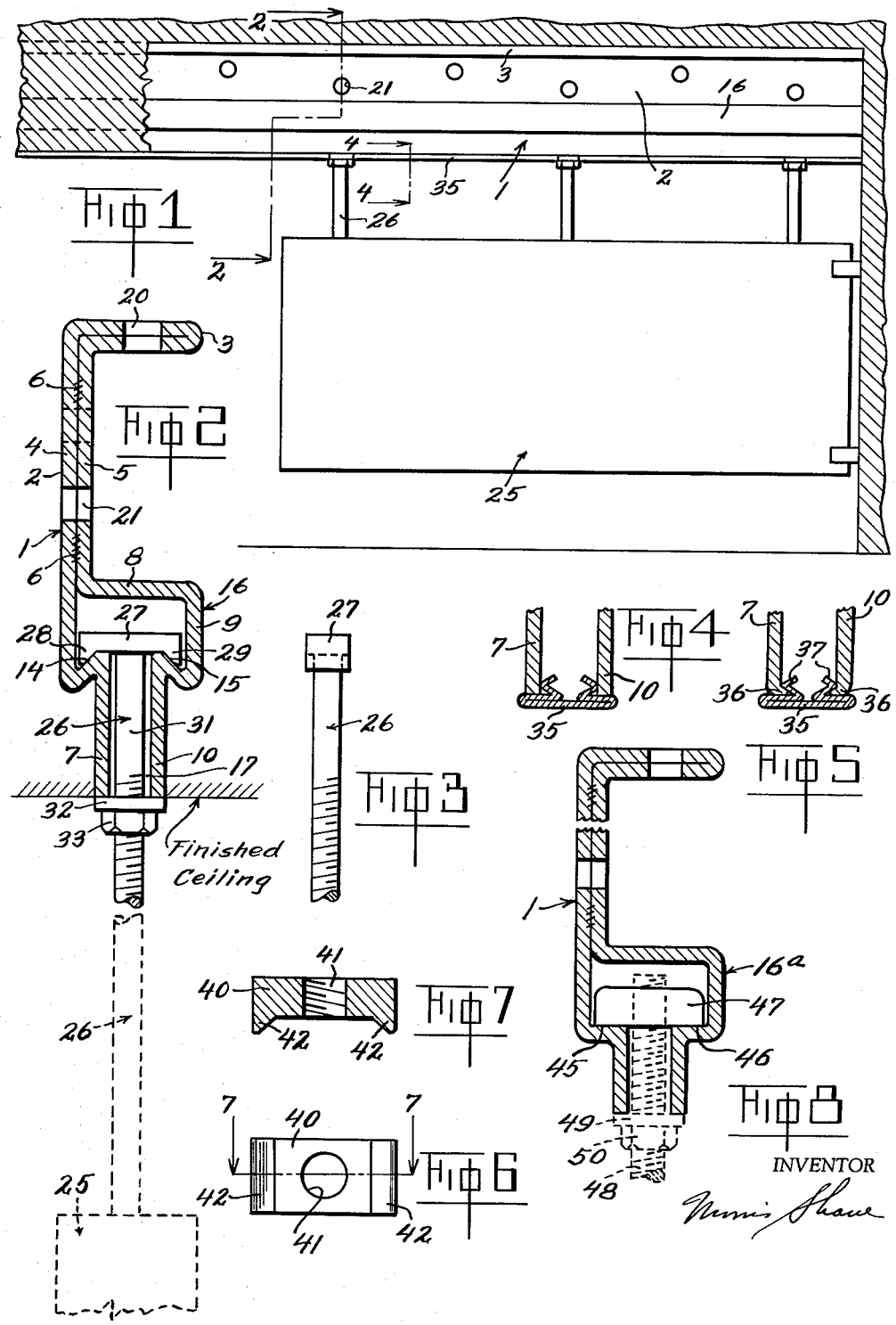
INVENTOR
Morris Shane Oct. 17, 1961 — M. SHANE — 3,004,636
CEILING SUPPORT MEMBER WITH ADJUSTABLE HANGER BOLTS
Filed March 18, 1959 — 2 Sheets-Sheet 2
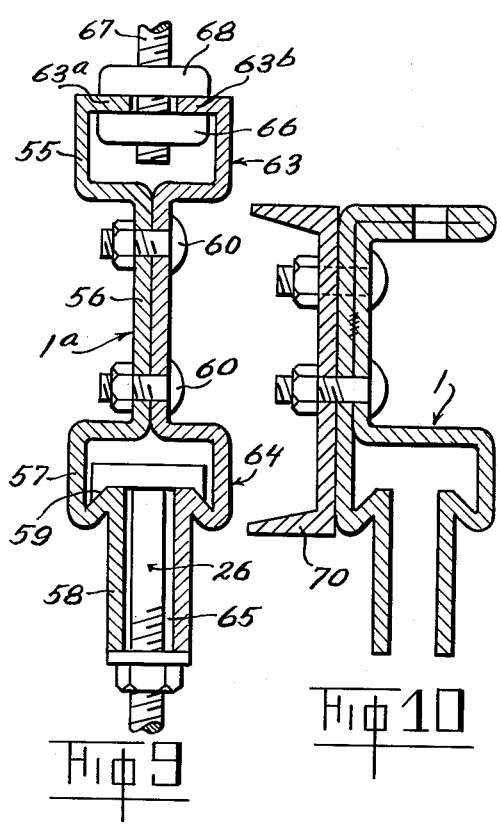
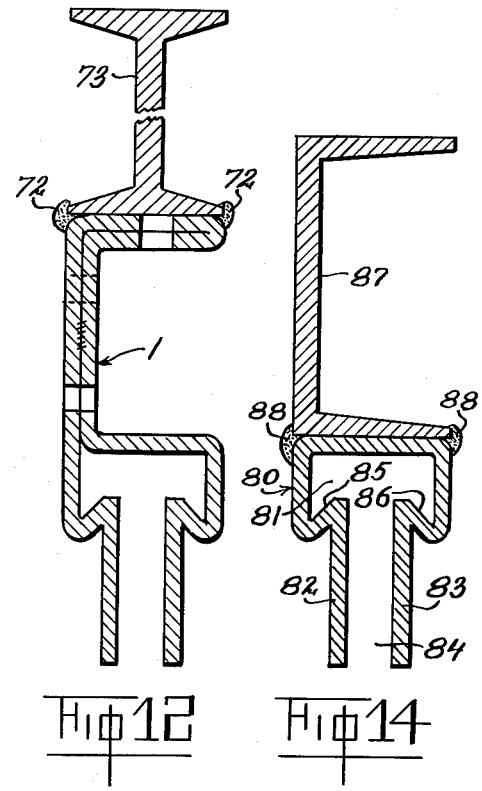
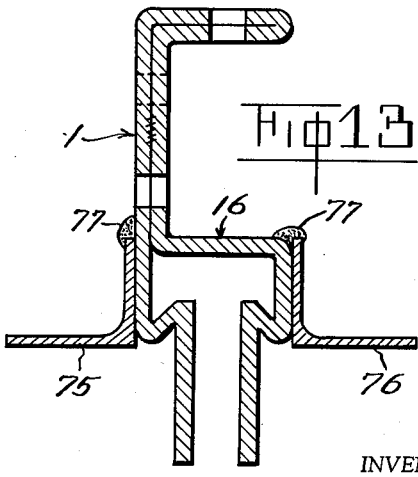
INVENTOR
Morris Shane

United States Patent Office

3,004,636
Patented Oct. 17, 1961

3,004,636
CEILING SUPPORT MEMBER WITH ADJUSTABLE HANGER BOLTS
Morris Shane, Westbury, N.Y., assignor to Flush-Metal Partition Corp., Long Island City, N.Y.
Filed Mar. 18, 1959, Ser. No. 800,202
6 Claims. (Cl. 189—34)

This invention relates to ceiling hung installations such as toilet partitions, pilasters and other like units, and more particularly to a supporting member that is adapted to be contained within the ceiling structure and from which the installation is hung.

It is the usual practice in building construction where ceiling hung installations are to be provided, to place the structural supports therefor under the miscellaneous or ornamental iron work. Toilet partition manufacturer furnishes bolt location drawings working from architectural drawings which latter usually show dimensions to block or rough walls. The bolts for hanging the partitions must be correctly located with regard to the finish wall lines and in relation to the position of the toilets. This requirement for accurate hanging bolt placement has, in present day working procedures, given rise to many problems and difficulties such for example:

(1) Entire row of bolts located wrong because structural member to which the same were fixed was in a wrong position.

(2) Bolts did not extend sufficiently below finished ceiling.

(3) Bolts were found loose and ceiling consequently had to be broken open in order to tighten bolts.

(4) Bolts were located in accordance with drawings but were wrong with relation to toilets for the reason that either the plumer could not locate fixtures according to drawings or there was lack of coordination between trades.

(5) Structural supports were found to be of insufficient length or if proper length, not properly installed, making it impossible to install all bolts required.

To overcome these and other difficulties, it is one object of this invention to provide a suspension construction not only applicable for toilet partition suspension but also for such installations as lighting fixtures and office partitions which construction is particularly suitable where loose, acoustical ceiling are used.

Another object of this invention is to provide a supporting member in which the hanging bolts suspending a partition or to which a pilaster is to be connected, may be adjustably located and moved therealong to their final operative and secured position.

A still further object of this invention is to provide a supporting member which in itself functions as a structural load carrying member, of elongated length, formed with a housing portion adapted to movably contain therein and support a plurality of headed bolts or nut elements to which are secured threaded rods.

An additional object of this invention is to provide a supporting member adapted to be secured to a variety of structural members, and to which auxiliary structural members may be secured for carrying ceiling elements or lighting fixtures, and which supporting member is further adapted to adjustably support a plurality of headed bolts or rods for suspending a partition therefrom.

A further object of this invention relates to providing an elongated supporting member with a housing and depending guide slot, the housing having a groove or track on each side of said guide slot which seat complementally shaped ends formed on a headed bolt the shank of which extends through said guide slot, the bolt head being insertable into and movable longitudinally within said housing to an adjusted location at which point the bolt is clamped in place by a clamp nut thereon, the ends of the bolt head coacting with the housing grooves or tracks to prevent spreading apart of the guide slot walls.

It is also an object of this invention to form a supporting member having a housing and depending extension walls defining a guide slot, the supporting member being adapted to be mounted within a ceiling structure with the lower edges of the guide slot walls providing reference surfaces to which the ceiling finish surface is brought, the supporting member being of elongated length and adapted to suspend present as well as future partition installations.

It is also an additional object of this invention to provide a supporting member arranged at its upper end to be connected to a plurality of aligned fixed ceiling bolts and to have adjustably connected to its lower end the hanging bolts suspending a partition.

Although reference is herein made to toilet partitions, it is to be understood that while the supporting member may be mounted within a ceiling structure, open or closed, and form which a toilet partion is hung, it is also usable for any type of installation wherein it is desired to suspend a partition from a ceiling, as for example, in business offices, beauty parlors, stores, medical examination rooms and in fact anywhere partitions are likely to be used.

The supporting member as set forth in the preceding objects of this invention also has universal application in installations other than in ceilings for suspending partitions, etc., and may therefore be employed in floors or walls, either mounted within the same and flush therewith (as in the ceiling structure aforesaid) or may be mounted exteriorly on the surface of a ceiling, floor or wall for the purpose of adjustably anchoring in selected positions partitions, machinery, fixtures or other equipment.

Other more detailed objects will be seen from the following description and accompanying drawings, of which—

FIG. 1 is a side elevational view showing a toilet partition hung from the supporting member.

FIG. 2 is a detail sectional view through the supporting member taken on line 2—2, FIG. 1.

FIG. 3 is a side elevational view of a hanging bolt or rod with integral head.

FIG. 4 is a detail sectional view showing application of a snap molding to the lower end of the supporting member.

FIG. 5 is a detail sectional view similar to that of FIG. 4 showing the lower end of the supporting member modified to receive the snap molding.

FIG. 6 shows a bottom view of a special nut construction for the hanging bolt or rod.

FIG. 7 is a sectional view of the nut of FIG. 6 taken on line 7—7, FIG. 6.

FIG. 8 shows a modified form of supporting member for receiving a conventional nut.

FIG. 9 shows a further modified form of supporting member for attachment to ceiling fixed hanging bolts or rods.

FIGS. 10, 11 and 12 show the manner of attachment of the supporting member to different structural load carrying members.

FIG. 13 shows the supporting member with structural load carrying members secured thereto for carrying ceiling elements or fixtures.

FIG. 14 shows a still further modified form of supporting member secured to a load carrying structural member.

Similar reference characters refer to similar parts throughout the several views of the drawings and specification.

Referring to the drawings, the basic partition supporting member 1 as shown in FIG. 1 constitutes an elongated continuous structural member formed in any desired length as a rolled section or bent up section of an overall somewhat channel shape. As seen in FIG. 2, the supporting member 1 is formed in one piece of sheet metal stock of a suitable gauge, bent on itself to define a vertical wall 2 of double thickness which is bent laterally outwardly at its upper end to provide a horizontal flange 3. The vertical wall 2 comprising wall portions 4 and 5 which are disposed in contacting engagement may, if so desired, be secured together in any suitable manner, preferably by spot welding as at 6, 6. The outer wall portion 4 of the vertical wall 2 is formed at its lower end with an inwardly and laterally offset wall extension 7. The inner wall portion 5 is bent horizontally laterally outwardly as at section 8 and vertically downwardly as at section 9, terminating in a laterally offset wall extension 10 opposite to and corresponding to the wall extension 7. Along the line of juncture of the offset wall extensions 7 and 10, respectively with wall portion 4 and wall section 9, there are formed parallel grooves or tracks 14, 15 with inclined surfaces disposed at the base of a box-shaped housing section 16 defined by the outer wall portion 2, and wall sections 8 and 9 of inner wall portion 5. The wall extensions 7 and 10 are identical, parallel to each other and to wall 2, and are spaced apart a distance less than the width of the box-shaped housing section 16 to define a guide slot 17 for the reception of a plurality of bolts to be hereinafter described.

The supporting member 1 may be placed in a ceiling structure in a variety of ways. It may in itself serve as a weight carrying structural member comparable to a floor joist. It may be secured to a joist or beam (not shown) by bolting the flange 3 thereto, the bolts being inserted through openings 20 provided in said flange 3, or it may be secured to such joist or beam by bolting the wall 2 thereto, the bolts being inserted through openings 21 formed in the wall 2. Other suitable fastening means such as screws or rivets may be employed and in some instances the supporting member 1 may be secured directly in position by welding. In any case, the supporting member 1 must be vertical and must be so placed in position, that the lower edges of the walls 7, 10 of the guide slot 17 will lie in the plane of the finished ceiling surface as designated by the line, see FIG. 2, so marked. Where a plaster ceiling is required, the lower edges of the guide slot walls 7, 10 provide gauge lines to which the plaster finish coating is brought, it being observed that there are no projections or protuberances to interfere with the plasterer in applying such finish coating.

It is to be understood that one such supporting member 1 will be provided for each partition wall that is to be hung from the ceiling. When accurately positioned in accordance with the architect's drawings, such supporting members 1 will serve as reference points for the exact locations of other installations such, for example, as plumbing lines.

The partition 25, see FIGS. 1 and 2 is hung from the support member 1 by a plurality of bolts 26. Each bolt 26 is formed with a head 27 of rectangular formation, having a width, see FIG. 3, that is slightly less than the gap or space between the walls 7, 10 of the guide slot 17. The ends of the head 27 are deflected downwardly and form lugs 28, 29 with inclined surfaces shaped to be complemental to the shape of the housing grooves or tracks 14, 15 so as to snugly seat therein and to be movable therealong, and the overall length of the head 27 is slightly less than the internal width of the housing 16 so as to preclude any binding action between the head and housing. The shank 31 of the bolt 26 is threaded for most of its length and is of a predetermined length depending on the desired height that the toilet partition 25 is to be hung from the ceiling.

In mounting the partition 25 the bolts 26, each provided with a washer 32 and nut 33, are first secured to the partition, there being any desired number of such bolts depending on the size and weight of the partition. The manner of securing the bolts 26 to the partition forms no part of the present invention. The bolts 26 are each initially placed with their heads 27 extending parallel to and in the same direction as the top edge of the partition, such as to permit insertion of said heads upwardly through the guide slot 17 into the housing 16, whereupon the bolts 26 are turned a quarter turn such that the lugs 28, 29 of the head 27 will seat in the housing grooves or tracks 14, 15 respectively. It will be obvious that the partition 25 may then be readily moved relative to the supporting member 1 to its proper position, the bolt heads 27 sliding on the grooves or tracks 14, 15 of the housing 16, and is secured in said position simply by setting up the nuts 33 on the bolts 26 to clamp the bolts to the supporting member as will be apparent in viewing FIG. 2. The lugs 28, 29 on the head 27 further act to prevent turning of the bolt and spreading apart of the guide slot walls 7, 10 in the event the clamp nut 33 is tightened with extreme pressure, this by virtue of the complementary inclined surfaces on the lugs 28, 29 and the grooves or tracks 14, 15 setting up a wedging action therebetween.

An alternative method for hanging the partition 25 resides in first inserting the bolts 26 with the heads 27 seated on the grooves or tracks 14, 15 of the housing 16, spacing the bolts 26 into desired position and clamping the same in place by setting up on the nuts 33, and lastly mounting the partition 25 on the lower end of the bolts.

To present a finished appearance the exposed open end portions of the guide slot 17 are closed by a snap molding 35, see FIGS. 1 and 4. If desired, the ends of the molding 35 may be suitably shaped and placed beneath the washers 32 (not shown) to positively hold the molding in place. As an added safeguard against separation of the molding, the lower terminal ends of the housing extension walls 7, 10 may be rolled along their opposed edges, to provide shoulders 36, see FIG. 5, to interlockingly engage with the snap portions 37 of the molding. Preferably the washers 32 are made square and of a width equal to the width of the snap molding 35 to facilitate a close fitting of the ends of the molding thereto. To conceal the bolts 26, washers 32 and nuts 33 there may be provided tubular sleeves (not shown) surrounding the same and extending between the snap moldings 35 and to the top of the partition 25, in the manner well known.

A modified form of construction resides in utlizing, in lieu of the bolt 26 with integral head 27, a nut 40, see FIGS. 6 and 7, shaped similar to bolt head 27 provided with a central threaded opening 41 adapted to receive the upper threaded end of a hanging rod (not shown) comparable otherwise in all respects to the bolt shank 31, which rod is appropriately secured to the partition 25. The nut 40 may be first threaded on the end of the rod and inserted through the guide slot 17 into the housing 16 in exactly the same manner as the head 27 on bolt 26. Lugs 42 on the nut 40 are adapted to ride in the housing grooves or tracks 14, 15, and function to prevent spreading apart of the guide slot walls 7, 10 as well as to keep the nut 40 from turning should it be necessary to adjust the rod therein.

In the modified form of supporting member shown in FIG. 8, the housing 16a of the supporting member 1 is formed at its lower end with horizontal shoulders 45, 46 which connect the offset guide slot walls 7, 10 with the housing walls. In this form of construction, the housing 16a is adapted to contain a prerequisite number of conventional nuts 47 which are placed within the housing 16a prior to the mounting of the supporting member 1 within the ceiling structure, the number of nuts equaling the number of threaded rods 48 employed to hang the partition. The housing width slightly exceeds the width of the nut 47 to allow for ease of movement thereof within the housing, while at the same time preventing turning of the nut when the rod is threaded therein. A washer 49 and clamp nut 50 are also provided on the rod 48 to securely clamp the same to the supporting member 1. This form of suspension member is applicable for non-rigid ceilings where possible spreading of the guide slot walls is not objectionable.

The supporting member can be designed with the same adjustable feature at its top as at its bottom. If this is done it would eliminate the necessity for locating the fixed hanging bolts or rods normally placed in the finished ceiling in exact positions. Thus, viewing FIG. 9 it will be seen that the supporting member 1a is formed of two identical rolled or bent elongated metal plate sections each comprising an upper channel portion 55, an intermediate web portion 56 bridging the upper channel portion 55 with a lower channel portion 57 havnig a wall extension 58 offset therefrom to define a groove or track 59 similar to the groove or track 14, 15, see FIG. 2. The two plate sections are secured in opposed abutting engagement by means of bolts 60, though they may equally as well be welded, riveted or screwed together. When joined together as will hereinafter be described, the supporting member 1a provides at its upper end a housing 63, the lower portion of the supporting member 1a providing a housing 64 and guide slot 65 identical respectively to the housing 16 and guide slot 17 of the supporting member 1, see FIG. 2. The housing 63 is shaped to receive conventional nuts 66.

The hanging bolts or rods 67, only one of which is shown, are already provided in the finished ceiling and in the normal building construction are not frequently at equal spaced apart distances. In the use of the form of supporting member 1a this is not material just so the hanging bolts or rods 67 are in the same straight line. In mounting the supporting member 1a on the hanging bolts or rods 67, each is first provided with a pair of nuts 66 and 68. With the lower nuts 66 all arranged at the same horizontal level, the two sections of the supporting member are brought together such that the lower nuts 66 will lie in the housing 63 with the uppermost flanges 63a and 63b thereof resting on the face of the nut with the bolt or rod 67 therebetween; the two sections then being secured together by the bolts 60 as previously indicated above. The upper nuts 68 are then set up against the flanges 63a and 63b thus securely clamping the supporting member 1a in position. Thus mounted, the supporting member 1a may then receive the partition bolts 26 in the manner as described above with reference to the supporting member 1, see FIG. 2.

It is to be understood that the housing 64 of the supporting member 1a may be shaped to receive a conventional nut such as shown by the housing 16a, FIG. 8.

FIGS. 10, 11, and 12 illustrate the mounting of the supporting member 1 to different structural elements located in the ceiling structure. Thus, in FIG. 10, the supporting member 1 is shown bolted to the side of a channel beam 70. In FIG. 11, the supporting member 1 is shown bolted to the flange of an angle-bar 71, while in FIG. 12, the supporting member 1 is shown welded as at 72 to the lower flanges of an I-beam 73.

Where necessary the supporting member 1 may have affixed thereto auxiliary members to accommodate ceiling elements or fixtures. Thus, by way of example, see FIG. 13, angle bars 75, 76 may be secured to the side walls of the housing 16 of the supporting member 1 by welds 77, which angle bars are adapted to carry the desired ceiling elements or fixtures. This arrangement is particularly advantageous where the structural member 1 in itself serves as a structural support member.

FIG. 14 illustrates a modification of the supporting member. In this form of construction, the supporting member 80 is formed in one piece to define a housing 81 with parallel inwardly offset walls 82, 83 forming a guide slot 84 and providing grooves or tracks 85, 86; the entire construction being comparable to the housing 16, guide slot 17, and grooves or tracks 14, 15 of the supporting member 1, FIG. 2. If desired, the housing 81 may be shaped to take conventional nuts, such as the housing 16a, FIG. 8. The supporting member 80 is shown secured to the underside of the bottom flange of a channel beam 87 as by welds 88. From the preceding description of the supporting member and its many applications to structural ceiling contained supports, it will be seen that its utilization as a support for suspended partitions provides the following advantages:

a. Reduces expensive field labor requirements, b. Eliminates possibility of error due to hanging bolts being installed in fixed positions prior to ceiling installation, c. Eliminates chopping of finished ceiling because of errors, d. Eliminates divided responsibility for installation of hanging bolts, e. Eliminates need for separate spacers under supporting member, f. Makes possible, changes in arrangement of pilasters without destroying or damaging ceiling, g. Makes possible the addition of future installations without any structural changes in the ceiling, h. Once the supporting member is installed other trades have a reference point for finished ceiling line.

The invention is not limited to the examples of embodiments represented and described in detail as various modifications may be made thereto without departing from the spirit of the invention. Also the invention may be utilized to support or attach installations other than partitions or pilasters from a ceiling and is adaptable for placement on or within other building components such as a wall or floor to secure a variety of structural units, machinery, etc.

Having thus described my invention, what I claim and desire to secure by Letters Patent is:

1. A supporting unit to be located wholly within a ceiling structure comprising an elongated member formed of sheet metal comprising vertical abutting wall portions, attachment flange means formed integrally with the vertical wall portions at the upper end thereof, a housing having vertical side walls formed integrally with the vertical wall portions at the lower end thereof, means securing the vertical wall portions together, inwardly directed spaced apart opposed shoulders at the lower ends of said housing side walls, a vertical guide wall depending from the free end of each shoulder to define therebetween a guide slot, a plurality of head elements within said housing, each of a width less than the width of said guide slot for insertion therethrough and seated at their ends on said housing shoulders for movement therealong to an adjusted position, each head element having fixed thereto a depending load carrying shank extending through said guide slot, each of said housing shoulders being formed to provide a transversely inclined track, and a depending wedge-shaped lug formed at the end of each head element complemental to said track to interlock therewith by a wedging action to prevent turning of the head element as well as to prevent spreading of the housing side walls and guide slot walls.

2. A supporting unit comprising an elongated structural member formed from heavy gauge sheet metal having a vertical wall of double thickness defining two separate wall portions, means securing said wall portions together, a horizontal attachment flange of double thickness extending laterally from the vertical wall at the upper end thereof, a housing at the lower end of said wall portions having parallel side walls each forming an integral part of a wall portion and with one side wall coextensive with one wall portion such that said housing will be located on the same side of said vertical wall as said horizontal flange to provide a structural channel formation to said supporting unit, inwardly directed spaced apart opposed shoulders at the lower ends of said housing side walls, a vertical guide wall depending from the free end of each shoulder to define a guide slot, a plurality of head elements within said housing, each of a width less than the width of said guide slot for insertion therethrough and seated at their ends on said housing shoulders for movement therealong to an adjusted position, each head element having fixed thereto a depending load carrying shank extending through said guide slot, and a row of bolt openings provided in said horizontal attachment flange and said vertical wall whereby said supporting unit may be secured to a horizontal or vertical supporting surface by the attachment of either the horizontal attachment flange or vertical wall, respectively thereto.

3. The supporting unit of claim 2, wherein each of said housing shoulders is formed to provide a transversely inclined track, a depending wedge-shaped lug formed at the end of each head element complemental to said track to interlock therewith by a wedging action to prevent turning of the head element as well as to prevent spreading of the housing side walls and guide slot walls.

4. A supporting unit comprising an elongated member formed of two complemental heavy gauge sheet metal parts disposed in opposed relation, each part having a central vertical wall, an upper vertical housing wall laterally offset from the vertical wall at the upper end thereof, a lower vertical housing wall similarly lateraly offset from the vertical wall at its lower end, an inwardly directed shoulder on each housing wall at the outermost ends thereof, a vertical guide wall depending from the free end of the shoulder on the lower housing wall, means removably securing said vertical walls together whereby to provide an upper housing with the shoulders of the walls thereof co-planar and so dimensioned as to provide a longitudinal bolt receiving gap therebetween and a lower housing with the shoulders thereof oppositely disposed and so dimensioned that the depending guide walls therefrom will provide a bolt receiving guide slot, the lower housing shoulders each formed to provide a transversely inclined track, at least one head element within said lower housing of a width less than the width of the guide slot for insertion therethrough, a depending wedge-shaped lug formed at each end of the head element complemental to said tracks to interlock therewith by a wedging action to prevent turning of the head element as well as to prevent spreading of the lower housing walls and guide slot walls, the head element having fixed thereto a depending load carrying bolt extending through said guide slot, and clamp means on said bolt for securing the same in fixed adjusted position to said elongated member, the upper housing functioning as an attachment means with the shoulders thereof adapted to be clamped between nut elements carried by a bolt extending through said gap.

5. A supporting unit to be located wholly within a ceiling structure comprising, an elongated metallic member including a vertical wall, means formed at the upper end of said vertical wall extending laterally from one side thereof, said vertical wall and said laterally extending means being adapted for selectively attaching the supporting unit to a fixed structural member within a ceiling structure, a housing at the lower end of said vertical wall having parallel side walls with one of said side walls co-extensive with said vertical wall, said laterally extending means and said housing lying on the same side of said vertical wall, inwardly directed spaced apart opposed shoulders at the lower ends of said housing side walls, a vertical guide wall depending from the free end of each shoulder to define therebetween a bolt receiving guide slot, a plurality of head elements within said housing, each of a width less than the width of said guide slot for insertion therethrough and seated at their ends on said housing shoulders for movement therealong to an adjusted position, each head element having fixed thereto a depending load carrying bolt, and clamp means on each said bolt for securing the same in fixed adjusted position to said elongated member, and the lower terminal edges of said guide slot walls defining a reference plane to which the finished ceiling surface is brought.

6. The supporting unit of claim 5, wherein each of said housing shoulders is formed to provide a transversely inclined track, a depending wedge-shaped lug formed at the end of each head element complemental to said track to interlock therewith by a wedging action to prevent turning of the head element as well as to prevent spreading of the housing side walls and guide slot walls and finishing molding strips secured to the lower terminal edges of said guide walls between said depending bolts to cover the exposed opening of said guide slot.

References Cited in the file of this patent

UNITED STATES PATENTS

| | | |
|---|---|---|
| 1,155,243 | Jordahl | Sept. 28, 1915 |
| 1,528,777 | Marting | Mar. 10, 1925 |
| 2,268,264 | Nimick et al. | Dec. 30, 1941 |
| 2,312,338 | Hulme | Mar. 2, 1943 |
| 2,808,136 | Hammitt et al. | Oct. 1, 1957 |